(12) United States Patent
McBride et al.

(10) Patent No.: US 10,678,661 B2
(45) Date of Patent: Jun. 9, 2020

(54) PROCESSING A RECALL REQUEST FOR DATA MIGRATED FROM A PRIMARY STORAGE SYSTEM HAVING DATA MIRRORED TO A SECONDARY STORAGE SYSTEM

(71) Applicant: INTERNATIONAL BUSINESS MACHINES CORPORATION, Armonk, NY (US)

(72) Inventors: Gregory E. McBride, Vail, AZ (US); Carol S. Mellgren, Tucson, AZ (US); David C. Reed, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/463,922

(22) Filed: Mar. 20, 2017

(65) Prior Publication Data
US 2018/0267723 A1    Sep. 20, 2018

(51) Int. Cl.
*G06F 3/06* (2006.01)
*G06F 11/16* (2006.01)
*G06F 11/14* (2006.01)

(52) U.S. Cl.
CPC .............. *G06F 11/16* (2013.01); *G06F 3/061* (2013.01); *G06F 3/067* (2013.01); *G06F 3/0649* (2013.01);
(Continued)

(58) Field of Classification Search
CPC .............................. G06F 11/14; G06F 3/0647
See application file for complete search history.

(56) References Cited

U.S. PATENT DOCUMENTS 6,353,878 B1 * 3/2002 Dunham ............. G06F 11/1456
707/999.009
6,446,175 B1 * 9/2002 West ................... G06F 11/1456
711/161
(Continued)

OTHER PUBLICATIONS

"Understanding Cloud Migration", by R. Wilson, Smarter Data Center Executive Summit, IBM Corp. 2014.
(Continued)

*Primary Examiner* — Charles Rones
*Assistant Examiner* — Tian-Pong Chang
(74) *Attorney, Agent, or Firm* — David W. Victor; Konrad Raynes Davda & Victor LLP

(57) ABSTRACT

Provided are a computer program product, system, and method for processing a recall request for data migrated from a primary storage system having data mirrored to a secondary storage system mirroring data from the primary storage system to the at least one secondary storage system. The primary storage system receives a recall request to recall a data object that was migrated from the primary storage system to a remote storage location. The recall request is transmitted to each of the at least one secondary storage system to cause each of the at least one secondary storage system receiving the recall request to directly retrieve the data object from the remote storage location. The primary storage system retrieves the data object from the remote storage location in response to the recall request. The primary storage system returns complete to the recall request in response to the data object being confirmed as restored to the primary storage system and the at least one secondary storage system.

23 Claims, 6 Drawing Sheets

(52) U.S. Cl.
CPC ............ *G06F 3/0685* (2013.01); *G06F 11/14* (2013.01); *G06F 3/0647* (2013.01)

(56) References Cited

U.S. PATENT DOCUMENTS

| | | | |
|---|---|---|---|
| 6,549,992 B1* | 4/2003 | Armangau | G06F 11/1456 |
| | | | 707/999.202 |
| 2005/0071372 A1* | 3/2005 | Bartfai | G06F 11/2071 |
| 2005/0193179 A1* | 9/2005 | Cochran | G06F 11/2058 |
| | | | 711/162 |
| 2012/0226664 A1 | 9/2012 | Habermann et al. | |
| 2014/0195636 A1 | 7/2014 | Karve et al. | |
| 2015/0088821 A1* | 3/2015 | Blea | G06F 16/119 |
| | | | 707/624 |
| 2016/0112407 A1* | 4/2016 | Nara | H04L 67/1095 |
| | | | 726/5 |
| 2017/0262346 A1* | 9/2017 | Pradhan | G06F 11/1464 |

OTHER PUBLICATIONS

"DS8870 Data Migration Techniques", by A. Warmuth et al., Document No. SG24-8257-00, Apr. 2015.

* cited by examiner

US 10,678,661 B2

PROCESSING A RECALL REQUEST FOR DATA MIGRATED FROM A PRIMARY STORAGE SYSTEM HAVING DATA MIRRORED TO A SECONDARY STORAGE SYSTEM

BACKGROUND OF THE INVENTION

1. Field of the Invention

The present invention relates to a computer program product, system, and method for processing a recall request for data migrated from a primary storage system having data mirrored to a secondary storage system.

2. Description of the Related Art

In a hierarchical storage management (HSM) system less frequently used data objects and data sets may be migrated to another location, such as a tape backup or cloud storage, to free space in the primary storage system. When data is migrated to a remote site, the volume table of contents (VTOC) is updated to indicate that the data has been migrated. For instance, when a data object in a primary volume is migrated, a volume entry for the migrated item is set to MIGRAT and the VTOC on that volume is updated to free the space used by the migrated volume. When a data set is recalled from the remote migration location back to the primary volume, the data set is returned to the volume. In data mirroring environments, the recalled data set may then be mirrored to secondary and further backup storage.

There is a need in the art for improved techniques for managing the recall of migrated data sets in data mirroring environments at remote locations.

SUMMARY

Provided are a computer program product, system, and method for processing a recall request for data migrated from a primary storage system having data mirrored to a secondary storage system mirroring data from the primary storage system to the at least one secondary storage system. The primary storage system receives a recall request to recall a data object that was migrated from the primary storage system to a remote storage location. The recall request is transmitted to each of the at least one secondary storage system to cause each of the at least one secondary storage system receiving the recall request to directly retrieve the data object from the remote storage location. The primary storage system retrieves the data object from the remote storage location in response to the recall request. The primary storage system returns complete to the recall request in response to the data object being confirmed as restored to the primary storage system and the at least one secondary storage system.

DETAILED DESCRIPTION

When recalling migrated data objects from a remote storage location, the recalled data object must be sent to the primary storage system and secondary storage systems to which data on the primary storage system is mirrored. To improve efficiency of recall operations, described embodiments have the primary storage system transfer the recall request to each secondary storage system in the data mirroring environment so that the primary and secondary storage systems each separately recall the data object. In environments, where the data object has been migrated to cloud storage, each of the primary and secondary storage systems may separately process the recall request to concurrently recall the migrated data object from the cloud or remote storage. This improves the efficiency of the recall operation, because the storage systems may concurrently recall the migrated data object to avoid having to separately transmit the recalled data object through a network to each of the secondary storage systems.

Figure 1:
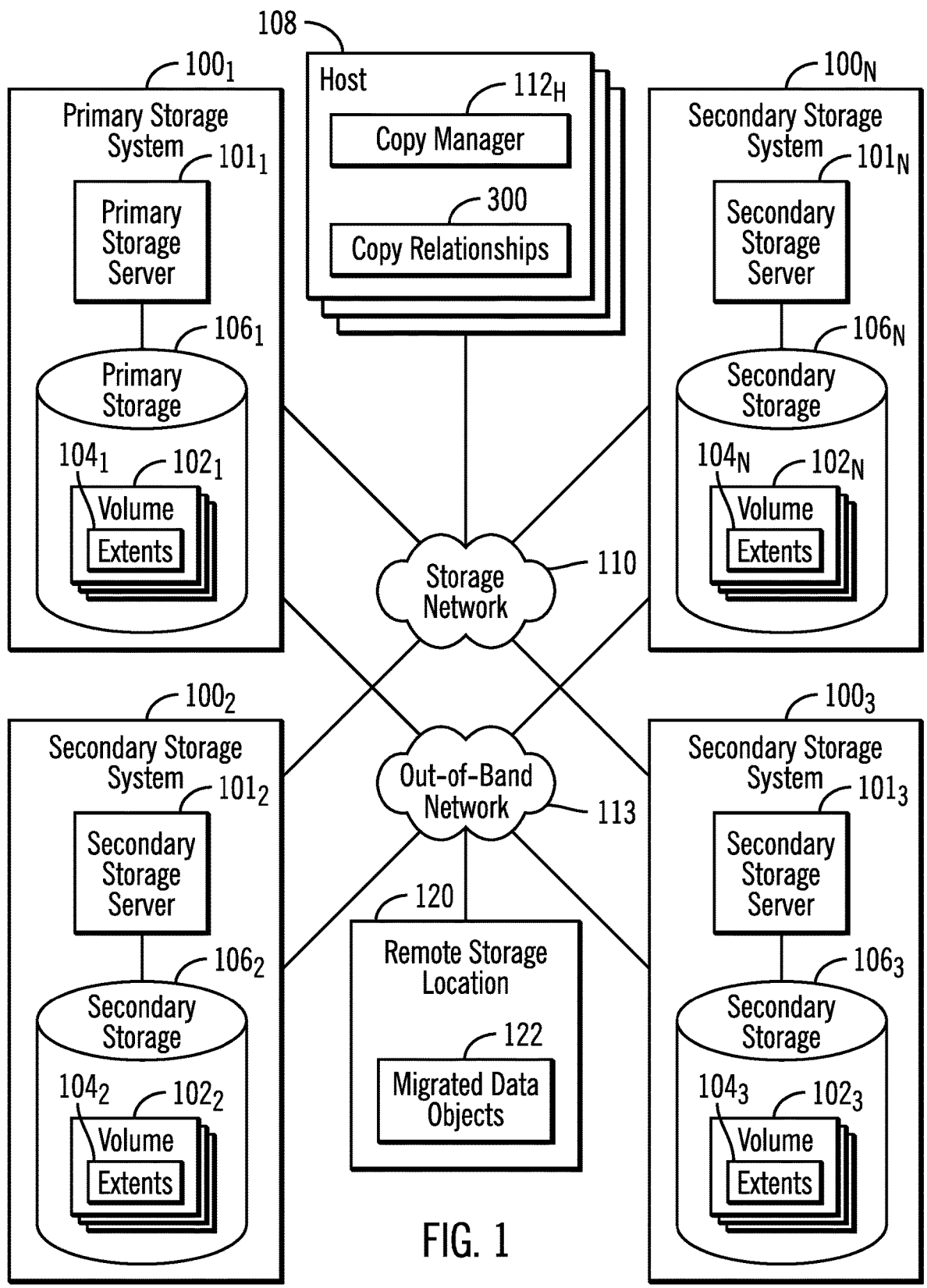
FIG. 1 illustrates an embodiment of a storage environment.

FIG. 1 illustrates an embodiment of a data storage environment having a plurality of storage systems $100_1$, $100_2$, $100_3$ ... $100_N$, each including storage servers $101_1$, $101_2$, $101_3$ ... $101_N$ managing access to volumes $102_1$, $102_2$, $102_3$ ... $102_N$ of extents $104_1$, $104_2$, $104_3$ ... $104_N$ configured in storages $106_1$, $106_2$, $106_3$ ... $106_N$. Host systems 108 perform read and write operations with respect to a primary storage system $100_P$, comprising one of the storage systems $100_1$, $100_2$, $100_3$ ... $100_N$, over a storage network 110. The primary storage $106_P$ has the primary production volume $102_P$, such as in storage $106_1$. The storage systems, such as storage systems $100_2$, $100_3$ ... $100_N$, may comprise secondary storage systems $100_2$, $100_3$ ... $100_N$. Any of the storage systems $100_1$, $100_2$, $100_3$ ... $100_N$ may functions as the primary storage system (production server) $100_P$ or secondary (backup/mirror) storage system $100_S$. Extents $104_1$, $104_2$, $104_3$ ... $104_N$ comprise groupings of tracks, blocks or other data units that is assigned to volumes $102_1$, $102_2$, $102_3$ ... $102_N$.

A remote storage location 120 provides remote storage of migrated data objects 122 comprising data objects the primary storage system $100_P$ migrates from the primary storage $106_P$. The storage systems $100_1$, $100_2$, $100_3$ ... $100_N$ may access the remote storage location 120 over an out-of-band network 113 separate from the storage network 110 the storage systems $100_1$, $100_2$, $100_3$ ... $100_N$ use to transmit mirrored data.

A migrated data object 122 may comprise a volume, data set, application object, range of extents or tracks, etc. In certain embodiments, the remote storage location 120 may comprise a cloud storage server to backup migrated data objects 122. When migrating a data object 122 to the remote storage location 120, the migrating storage system $100_P$ may update the volume table of contents (VTOC) or file allocation table at the primary storage $106_P$ to indicate that the migrated data objects 122 were migrated and are no longer available on the primary storage $106_P$. The space in the primary storage $106_P$ having the migrated data may be freed and available for other use. When the updated VTOC for the primary volume $102_P$ is mirrored to the secondary storage systems $100_S$ then the updated secondary volume $102_S$ VTOC would indicate that the data objects 122 in the secondary storage $106_S$ have been migrated.

The host 108 includes a copy manager program $112_H$ to generate requests to establish point-in-time copies of source data in a primary volume $102_P$ to target data in secondary volumes $102_S$ by submitting a point-in-time copy establish request to the primary storage system $100_P$. The point-in-time copies are defined in copy relationships 300 maintained in the host 106 and storage systems $100_1$, $100_2$, $100_3$ . . . $100_N$.

The term "storage system" as used herein may refer to a storage server $101_1$, $101_2$, $101_3$ . . . $101_N$ and/or the storage $106_1$, $106_2$, $106_3$ . . . $106_N$ managed by the server.

Figure 2:
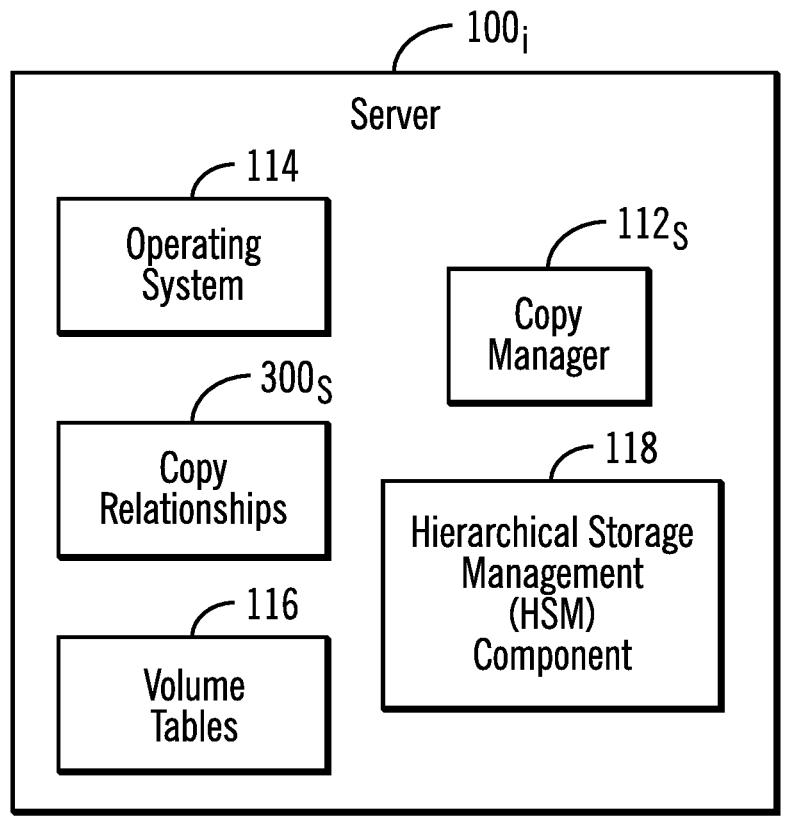
FIG. 2 illustrates an embodiment of components in a storage server for a storage system.

FIG. 2 shows the components included in each of the storage systems $100_1$, $100_2$, $100_3$ . . . $100_N$, including an operating system 114 and a point-in-time copy manager 112 to create and manage copy relationships 300, which may also be stored in the corresponding storage $106_1$, $106_2$, $106_3$ . . . $106_N$.

The operating system 114 in the storage systems $100_1$, $100_2$, $100_3$ . . . $100_N$ assigns extents of tracks in the storage $106_1$, $106_2$, $106_3$ . . . $106_N$ to the volumes $102_1$, $102_2$, $102_3$ . . . $102_N$, where data is stored in data units, such as tracks, logical block addresses (LBAs), extents, etc. An extent comprises a grouping of tracks, blocks or other data units that is assigned to volumes $102_1$, $102_2$, $102_3$ . . . $102_N$. The operating system 114 maintain volume tables 116, such as a volume table of contents (VTOC), file allocation table, etc., providing information on the configured volumes $102_1$, $102_2$, $102_3$ . . . $102_N$. The operating system 114 further manages I/O requests from the host systems 108 with respect to the volumes $102_1$, $102_2$, $102_3$ . . . $102_N$.

The storage system $100_1$ may further include a hierarchical storage management (HSM) component 118 to migrate data objects 122 to a remote storage location 120 over the out-of-band network 113 and update the volume table 116 to indicate that the data 122 was migrated. The updated volume table 116 indicating that the data objects 122 were migrated would then be mirrored to the secondary storage systems $100_2$, $100_3$ . . . $100_N$. The HSM component 118 may further recall a migrated data object 122 from the remote storage location 120 when a host wants to access a migrated data object 122.

The storages $106_1$, $106_2$, $106_3$ . . . $106_N$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $102_S$, $102_T$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$, $106_3$ . . . 106N may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the host 108 to access the storage systems $100_1$, $100_2$, $100_3$ . . . $100_N$ and used by the storage systems $100_1$, $100_2$, $100_3$ . . . $100_N$ to mirror data may comprise a storage network such as one or more interconnected Local Area Networks (LAN), Storage Area Networks (SAN), Wide Area Network (WAN), peer-to-peer network, wireless network, etc. The out-of-band network 113 may be separate from and out-of-band from with respect to the storage network 110, such as the Internet. In alternative embodiment networks 110 and 112 may be on a same network. In this way, operations to recall the migrated data objects 122 will not increase traffic on the storage network 110 and thus not affect latency on the storage network 110.

Figure 3:
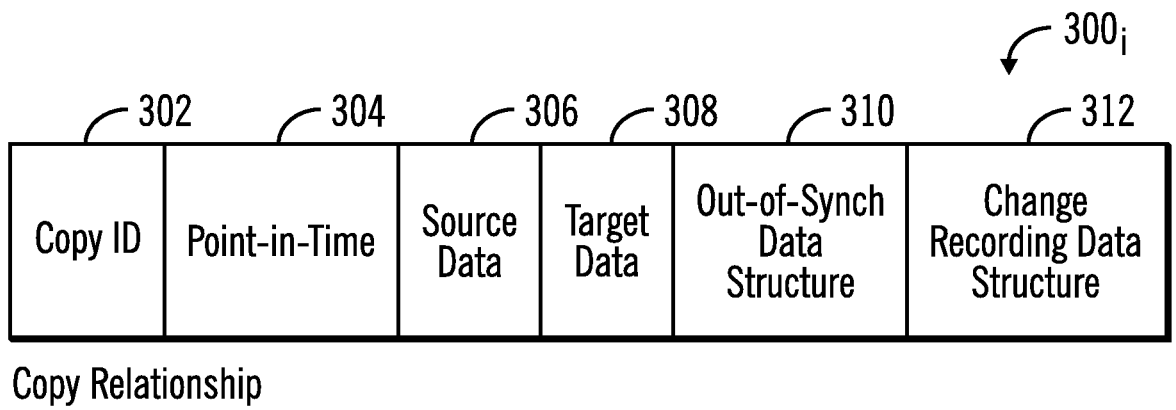
FIG. 3 illustrates an embodiment of copy relationship information.

FIG. 3 illustrates an instance of a copy relationship $300_i$, which may include a PiT copy identifier 302 identifying the PiT copy created by the copy manager $112_i$ (i.e., $112_H$, $112_S$) at a storage system $100_i$; a point-in-time 304 of the PiT copy 302, such that data is consistent as of that point-in-time 304; source data 306, e.g., primary volume $102_i$ at a primary storage system $100_i$, from which data is copied; target data 308, e.g., secondary volume $102_i$, at a secondary storage system $100_i$ to which the PiT data is copied; out-of-synch data structure 310, such as a bitmap, indicating source data 306 as of the point-in-time 304 that needs to be copied to the target data 308 to complete the point-in-time copy; and change recording information 312, such as a change recording bitmap, indicating source 306 or target data 308 that has been updated or changed following the point-in-time of the point-in-time copy $300_i$ currently being mirrored to the secondary storage system.

A copy relationship $300_i$ may define an asynchronous copy comprised of a consistency group providing data that is consistent as of the point-in-time 304, which uses the out-of-synch data structure 310 and change recording data structure 312. A copy relationship $300_i$ may further define a synchronous copy where data is continually mirrored from the source data 306 to target data 308. For a synchronous mirror in which new data is continually transmitted to the secondary storage, only the change recording data structure 312 is needed.

In described embodiments, the source data 306 and target data 308 are in different volumes $102_1$, $102_2$, $102_3$ . . . $102_N$ managed by different storage systems $100_1$, $100_2$, $100_3$ . . . $100_N$. Alternatively, the source 306 and target data 308 of a copy relationship may be on the same volume in the same storage 106i.

The creation of a copy relationship $300_i$ is instantaneous and allows host 108 processes to continue accessing source data 306 of the copy relationship while actual mirroring of to the secondary storages are deferred to a later time. The point-in-time copy establishment appears instantaneous because the primary copy manager $112_P$ returns I/O complete to the host copy manager $112_H$ in response to generating the relationship $300_i$ data structures without copying the data.

FIG. 3 shows a copy relationship $300_i$ comprising a consistency group to have data structures 310 and 312 to allow generating a consistency group at a secondary storage system that is consistent as of the point-in-time 304. For a synchronous data mirroring copy relationship, the change recording information 312 data structure is used to ensure that any changes to the primary source data 306 are mirrored to the secondary target data 308 without forming a consistency group at the secondary target data that is consistent as of a point-in-time.

Figure 4:
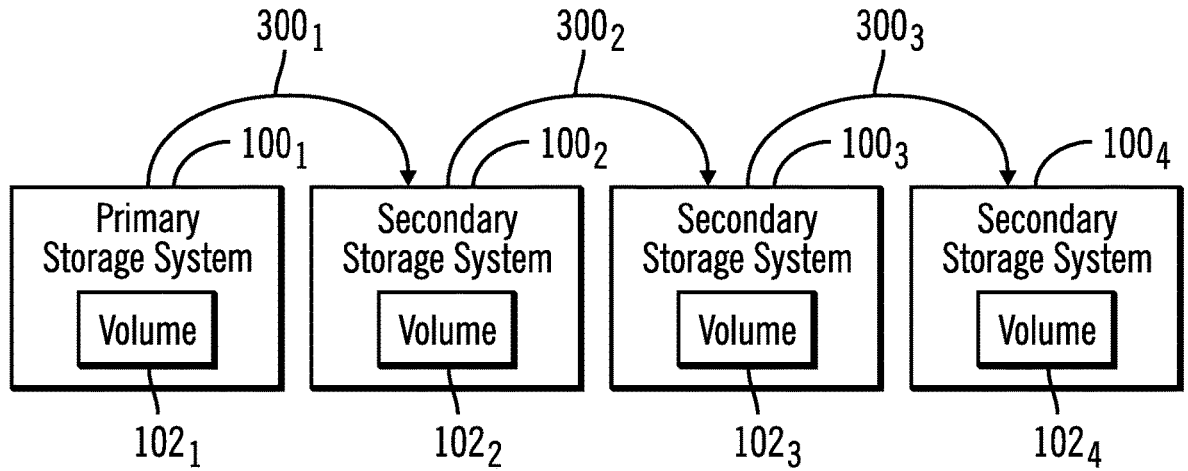
FIG. 4 illustrates an embodiment of a cascade copy relationship of primary and secondary storage systems.

FIG. 4 illustrates a cascade copy relationships $300_1$, $300_2$, $300_3$ established to cascade mirror data from a primary storage system $100_1$ to secondary storage systems $100_2$, $100_3$, $100_4$ by having copy relationships $300_2$ and $300_3$ where secondary storage systems $100_2$ and $100_3$ also function as primary servers to mirror data from the primary volumes $102_P$ to storage systems $100_3$ and $100_4$, respectively.

Figure 5:
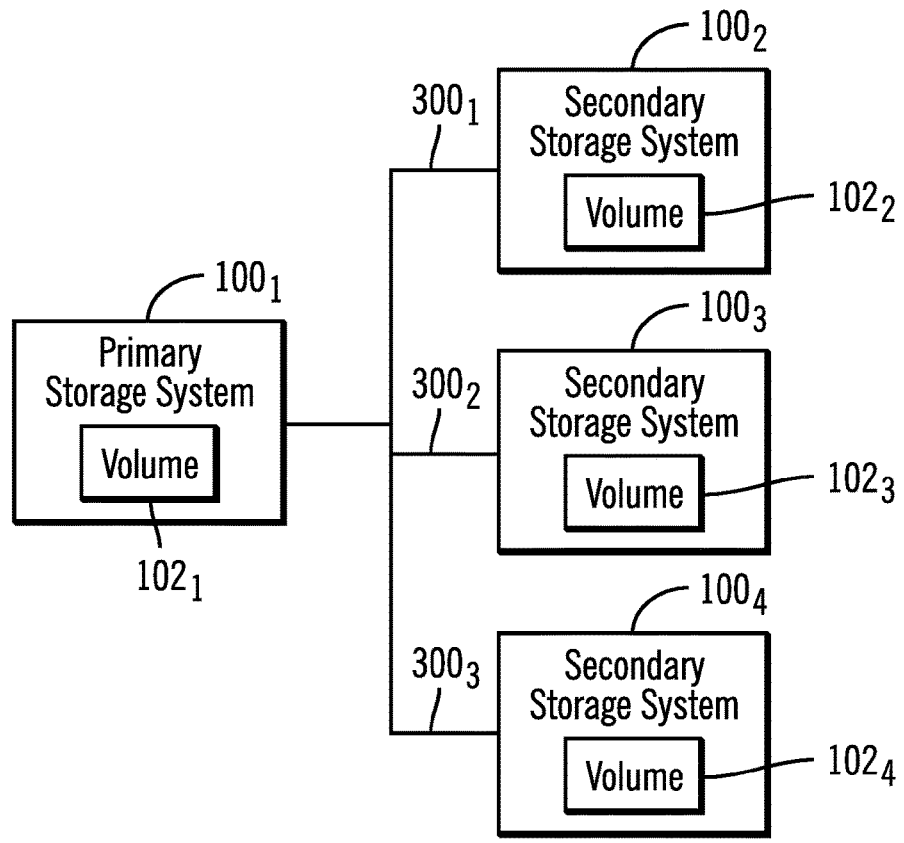
FIG. 5 illustrates an embodiment of a multi-target copy relationship of primary and secondary storage systems.

FIG. 5 illustrates a multi-target copy relationships where the primary storage system $100_1$ has direct copy relationships $300_1$, $300_2$, $300_3$ to each of the secondary storage systems $100_2$, $100_3$, $100_4$ to directly mirror or copy data to each of the secondary storage systems $100_2$, $100_3$, $100_4$.

Alternative configurations may also be used. For instance, in addition to the primary storage system $100_1$ having a multi-target copy relationship to directly copy data to multiple of the secondary storage systems, some of the secondary storage systems may also operate as primary storage systems to further mirror data to further secondary storage systems from the primary storage system $100_1$ through one or more secondary storage systems.

Figure 6:
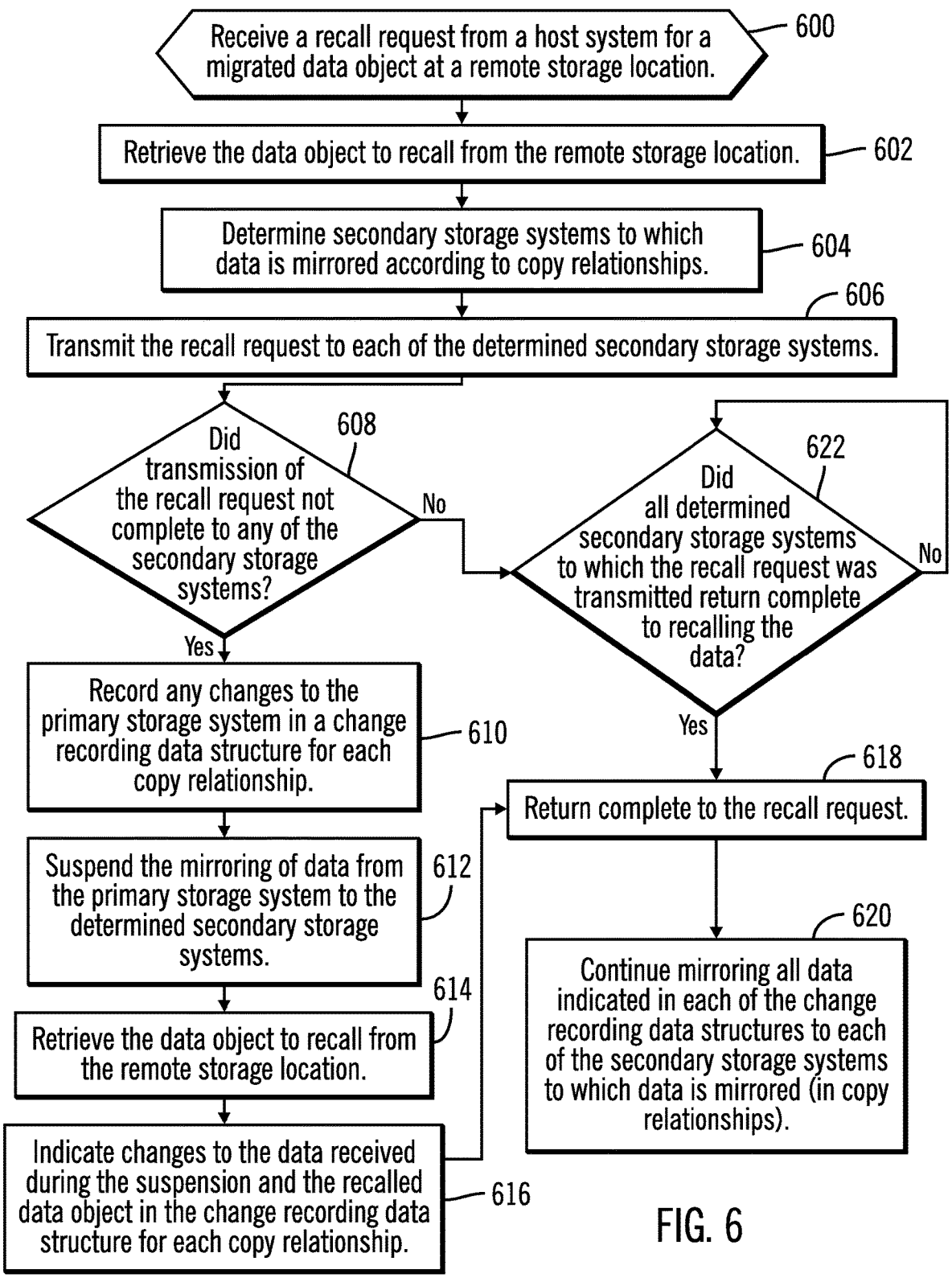
FIG. 6 illustrates an embodiment of operations to recall a migrated data object in a synchronous mirroring environment.

FIG. 6 illustrates an embodiment of operations performed by the HSM component 118 and/or copy manager $112_P$ to process a recall request in a synchronous mirroring environment, where data that is changed in the primary storage $106_P$, which may comprise any of the storages $106_1$, $106_2$, $106_3$ . . . $106_N$, is mirrored to one or more other secondary storages $106_S$. FIG. 6 addresses embodiments where the data from the primary volume is synchronously mirrored to the secondary volume. A primary storage system $100_P$ performing the operations in FIG. 6 may comprise a first storage system in the storage environment receiving the recall request or a secondary storage systems $100_S$ also functioning as a primary storage system in a cascade relationship Upon a primary storage systems $100_P$ receiving (at block 600) a recall request from the host system 108 for a migrated data object 122 at a remote storage location 120, the HSM component 118 in the receiving primary storage system $100_P$ retrieves (at block 602) the data object 122 to recall from the remote storage location 120 over the network 110. The copy manager $112_P$ determines (at block 604) one or more secondary storage systems $100_S$ to which data is mirrored, as indicated in one or more copy relationships $300_i$. The recall request to retrieve the migrated data object 122 is transmitted (at block 606) to each of the determined secondary storage systems $100_S$ indicated in the determined copy relationships.

If (at block 608) the transmission of the recall request did not complete to any of the secondary storage systems $100_S$ to which it was transmitted, which may occur if there are network 110 problems or other failures, then the copy manager $112_P$ at the primary storage system $100_P$ records (at bock 610) any changes to the primary storage system in a change recording data structure 312 for each copy relationship $300_i$ to which data is mirrored. The copy manager $112_P$ suspends (at block 612) the mirroring of data from the primary storage system $100_P$ to the determined secondary storage systems $100_S$. The HSM component 118 at the primary storage system $100_P$ retrieves (at block 614) the migrated data object 122 to recall from the remote storage location 120 and storage in the primary volume $102_P$. Any changes received to the primary storage $106_P$ during the suspension and the recalled data object 112 are indicated (at block 616) in the change recording data structure 312 for each determined copy relationship $300_i$. At this point, complete may be returned (at block 618) to the recall request and the primary copy manager $112_P$ may continue (at block 620) mirroring all data indicated in each of the change recording data structures 312 to each of the secondary storage systems $100_S$ to which data is mirrored (in copy relationships $300_i$). In this way if the mirroring is suspended, the recalled data object 122 is copied to the secondary storage systems $100_S$ through the change recording data structure 312.

If (at block 610) the recall request was successfully transmitted to each of the secondary storage systems $100_S$, then the copy manager $112_P$ determines (at block 622) whether each of the secondary storage systems to which the recall request was transmitted return complete to recalling. If complete has not yet been returned for all secondary storage systems receiving the recall request, then control returns to block 622 to wait until all the secondary storage systems $100_S$ successfully complete the recall of the migrated data object 122 by retrieving from the remote storage location 120. If (at block 622) all the secondary storage systems $100_S$ return complete to recalling the data object 122 from the remote storage location 120, then control proceeds to block 618 to complete the recall.

With the operations of FIG. 6, each of the secondary storage systems $100_S$ may independently and directly retrieve the migrated data object 122 from the remote storage location 120. In this way, traffic on the network 110 the storage systems $100_1$, $100_2$, $100_3$ . . . $100_N$ use for mirroring data is reduced by having the secondary storage systems retrieve the migrated data object 122 from the remote storage location 120 over a separate out-of-band network 113, such as the Internet. If the secondary storage systems $100_S$ are unable to receive the recall request, then the primary storage system $100_P$ will have to transmit the retrieved data object 122 of the network 110 to the secondary storages $100_S$ over the network 110 during mirroring.

Figure 7:
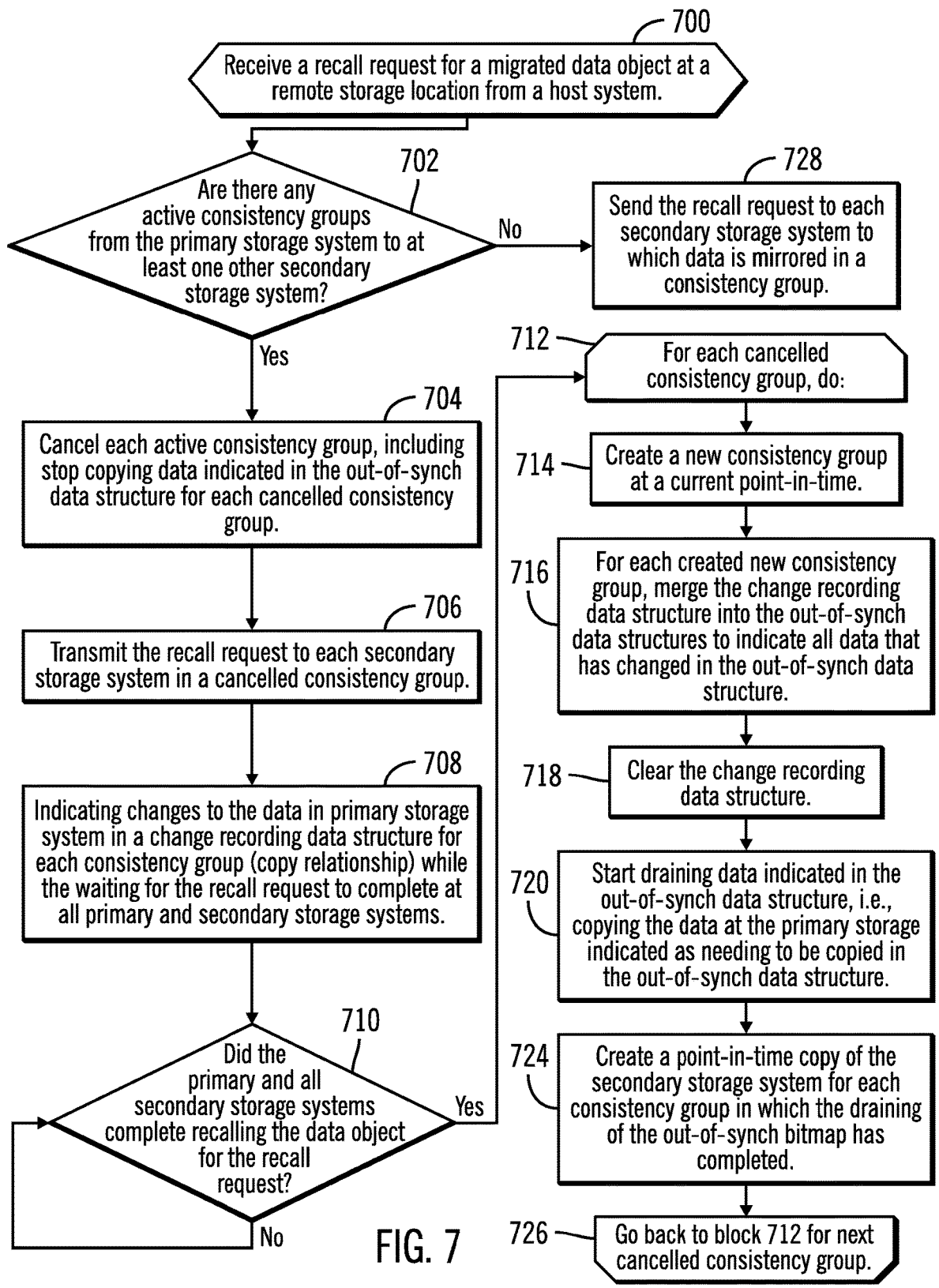
FIG. 7 illustrates an embodiment of operations to recall a migrated data object in an asynchronous mirroring environment.

FIG. 7 illustrates an embodiment of operations performed by the HSM component 118 and/or copy manager $112_P$ to process a recall request when consistency groups $300_i$ are formed between primary and secondary storage systems, also known as asynchronous mirroring. A primary storage system $100_P$ performing the operations in FIG. 7 may comprise a first storage system in the storage environment receiving the recall request or a secondary storage system $100_S$ also functioning as a primary storage system in a cascade relationship Upon a primary storage system $100_P$ receiving a recall request for a migrated data object 122 at a remote storage location 120 from a host system 108, the copy manager $112_P$ determines (at block 702) whether there are any active consistency groups $300_i$, for which data is being transferred from an out-of-synch data structure 310 to target data 308 at a secondary storage system $100_S$ to make the data consistent as of the point-in-time 304. If (at block 702) there are active consistency groups $300_i$, then the copy manager $112_P$ cancels (at block 704) each active consistency group $300_i$, including stop copying data indicated in the out-of-synch data structure 310 for each cancelled consistency group $300_i$. The recall request to recall the migrated data object 122 is transmitted (at block 706) to each secondary storage system $100_S$ having the target data 308 for one of the cancelled consistency groups $300_i$. The copy manager $112_P$ indicates (at block 708) changes to the data in the primary storage $106_P$ in a change recording data structure 312 for each consistency group (copy relationship) $300_i$ while waiting for the recall request to complete at the primary storage system $100_P$ and each secondary storage systems $100_S$ in consistency groups $300_i$ with the primary storage system $100_P$.

At block 710, the copy manager $112_P$ waits until the primary $100_P$ and all secondary storage systems $100_S$ complete recalling the migrated data object 122 for the recall request. After all the recall requests complete, a loop of operations is performed at blocks 712 through 726 for each cancelled consistency group $300_i$. At block 714, the primary copy manager $112_P$ creates a new consistency group $300_i$ at a current point-in-time 304. For each created new consistency group $300_i$, the copy manager $112_P$ merges (at block 716) the change recording data structure 312 into the out-of-synch data structure 310 to indicate all data that has changed in the out-of-synch data structure 310, which also indicates point-in-time data to copy from canceled consistency group $300_i$. The change recording data structure 312 is cleared (at block 718) and the copy manager $112_P$ starts draining the data indicated in the out-of-synch data structure 310, i.e., copying the data at the primary storage $106_P$ indicated as needing to be copied in the out-of-synch data structure 310. After completing copying all the data in the out-of-synch data structure 310, the copy manager $112_S$ at the secondary storage system $100_S$ in each consistency group $300_i$, to which all the data in the out-of-synch data structure 310 was copied, creates (at block 724) a point-in-time copy, such as a FlashCopy®, snapshot, etc., of the secondary storage $106_S$ to preserve that point-in-time copy. (FlashCopy is a registered trademark of International Business Machines Corporation throughout the world).

With the embodiment of FIG. 7, the consistency groups being formed are abandoned or cancelled upon receiving a recall request at the primary storage system $100_P$ because having the secondary storage systems $100_S$ access the recalled data object 122 would conflict with the point-in-time copy being formed at the secondary storage system $100_S$ while draining the out-of-synch data structure 310. With the described embodiments, the current consistency group being formed is canceled and after the secondary storage systems recall the migrated data object 122, then a new consistency group can be formed and all data received as of the new point-in-time in the change recording data structure 312 and out-of-synch data structure 310 are copied over to the secondary storage systems. By having the secondary storage systems $100_S$ independently retrieve the data object 122 from the remote storage location 120 over the out-of-band network 113, the recall and migration operations do not increase traffic and latency on the storage network 110.

The reference characters used herein, such as i, N, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the servers $101_1$, $101_2$, $101_3$ . . . $101_N$ and host 108 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

Figure 8:
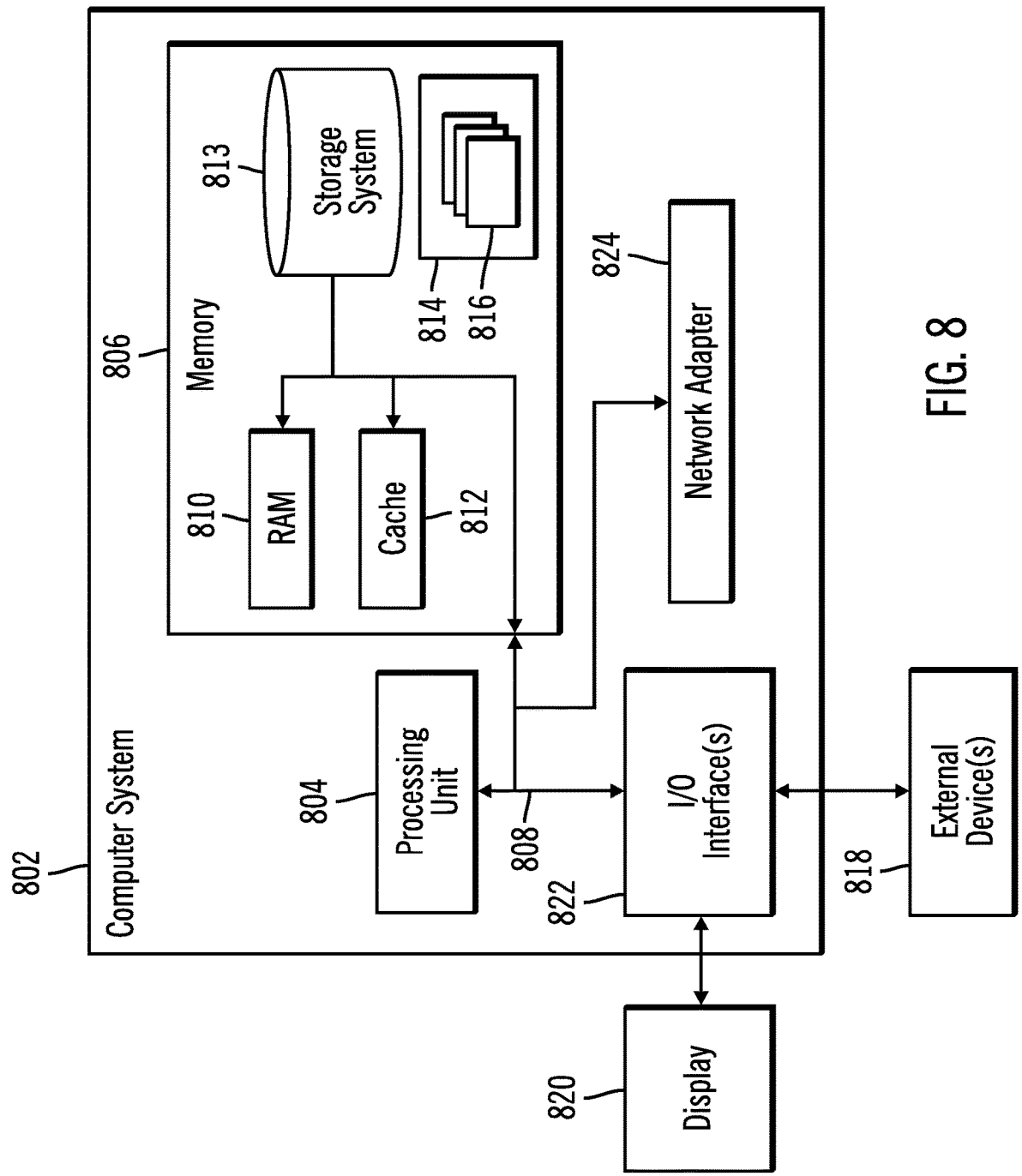
FIG. 8 illustrates a computing environment in which the components of FIG. 1 may be implemented.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for recalling data at a primary storage system coupled to a plurality of secondary storage systems, wherein the computer program product comprises a computer readable storage medium deployed at the primary storage system having program instructions embodied therewith, the program instructions executable by a processor to cause operations, the operations comprising:

mirroring data from the primary storage system to the secondary storage systems;

migrating, from the primary storage system, data objects to a remote storage location external to the primary storage system and the secondary storage systems, wherein the remote storage location stores migrated data objects from the primary storage system;

receiving, at the primary storage system, a recall request to recall a data object that was migrated from the primary storage system to the remote storage location;

causing transmission of the recall request to each of the secondary storage systems to cause each of the secondary storage systems receiving the recall request to directly retrieve the data object to recall from the remote storage location;

retrieving, by the primary storage system, the data object to recall from the remote storage location in response to the recall request; and returning, by the primary storage system, complete to the recall request in response to the data object to recall being confirmed as restored to the primary storage system and each of the secondary storage systems.

2. The computer program product of claim 1, wherein the remote storage location is implemented in a cloud computing storage system accessible over an Internet, wherein the primary and the secondary storage systems communicate over a storage network separate from the Internet.

3. The computer program product of claim 1, wherein the causing transmission of the recall request to the secondary storage systems comprises the primary storage system transmitting the recall request to each of the secondary storage systems to cause the secondary storage systems to directly recall the data object from the remote storage location.

4. The computer program product of claim 1, wherein the primary storage system and the secondary storage systems are in a cascade copy relationship, wherein a subset of the secondary storage systems operate as primary storage systems to mirror data to other of the secondary storage systems, wherein the causing the transmission of the recall request comprises each of the primary storage system and the subset of the secondary storage systems receiving the recall request further transmitting the recall request to one of the secondary storage systems to which data is mirrored from the primary storage system and the subset of the secondary storage systems.

5. The computer program product of claim 1, wherein the operations further comprise:

in response to determining that the transmission of the recall request did not complete to at least one of the secondary storage systems, performing:

suspending mirroring of data to the secondary storage systems; and indicating in a change recording data structure changes to data in the primary storage system resulting from host write operations and the recalling of the data object after suspending the mirroring of the data.

6. The computer program product of claim 5, wherein the operations further comprise:

determining one of the secondary storage systems is accessible after determining that the recall request could not be transmitted to the determined secondary storage system; and transmitting changes to data at the primary storage system indicated in the change recording data structure to the determined secondary storage system in response to determining that the determined secondary storage system is accessible.

7. The computer program product of claim 1, wherein the operations further comprise:
creating a consistency group for data on the primary storage system as of a point-in-time for each of the secondary storage systems to which data is mirrored, wherein data as of the point-in-time is copied to the secondary storage systems, wherein the recall request is received while copying the data as of the point-in-time to the secondary storage systems; and
cancelling each consistency group in response to receiving the recall request while copying the data as of the point-in-time to the secondary storage systems to end copying over data as of the point-in-time to the secondary storage systems.

8. The computer program product of claim 7, wherein the point-in-time comprises a first point-in-time, wherein the operations further comprise for each cancelled consistency group:
recording updates to the data at the primary storage system in a change recording data structure before the recalling of the data object to the primary storage system has completed;
creating a new consistency group at a second point-in-time having the primary storage system and a secondary storage system in the cancelled consistency group after completing the recalling of the data object to the primary storage system and the secondary storage system; and
copying over data at the primary storage system as of the second point-in-time not yet mirrored to the secondary storage system for the new consistency group, including updates indicated in the change recording data structure, to the secondary storage system as part of the new consistency group.

9. The computer program product of claim 8, wherein the operations further for each consistency group that was canceled:
maintaining an out-of-synch data structure indicating changed data in the primary storage system as of the first point-in-time that have not yet been mirrored to the secondary storage system in the new consistency group;
copying data indicated in the out-of-synch data structure to the secondary storage system for the consistency group for the first point-in-time before the receiving the recall request; and
in response to creating the new consistency group, merging indication of changed data in the change recording data structure with changed data indicated in the out-of-synch data structure so that the out-of-synch data structure indicates data as of the first point-in-time and changed data in the primary storage system received after the first point-in-time, wherein the copying over the data at the primary storage system as of the second point-in-time not yet mirrored comprises the changed data indicated in the out-of-synch data structure merged with the change recording data structure.

10. A system for recalling data comprising a primary storage system coupled to secondary storage systems, comprising:
a processor; and
a computer readable storage medium deployed having program instructions embodied that when executed by the processor perform operations, the operations comprising:
mirroring data from the primary storage system to the secondary storage systems;
migrating, from the primary storage system, data objects to a remote storage location external to the primary storage system and the secondary storage systems, wherein the remote storage location stores migrated data objects from the primary storage system;
receiving, at the primary storage system, a recall request to recall a data object that was migrated from the primary storage system to the remote storage location;
causing transmission of the recall request to each of the secondary storage systems to cause each of the secondary storage systems receiving the recall request to directly retrieve the data object to recall from the remote storage location;
retrieving, by the primary storage system, the data object to recall from the remote storage location in response to the recall request; and
returning, by the primary storage system, complete to the recall request in response to the data object to recall being confirmed as restored to the primary storage system and each of the secondary storage systems.

11. The system of claim 10, wherein the remote storage location is implemented in a cloud computing storage system accessible over an Internet, wherein the primary and the secondary storage systems communicate over a storage network separate from the Internet.

12. The system of claim 10, wherein the causing transmission of the recall request to the secondary storage systems comprises the primary storage system transmitting the recall request to each of the secondary storage systems to cause the secondary storage systems to directly recall the data object from the remote storage location.

13. The system of claim 10, wherein the operations further comprise:
in response to determining that the transmission of the recall request did not complete to at least one of the secondary storage systems, performing:
suspending mirroring of data to the secondary storage systems; and
indicating in a change recording data structure changes to data in the primary storage system resulting from host write operations and the recalling of the data object after suspending the mirroring of the data.

14. The system of claim 13, wherein the operations further comprise:
determining one of the secondary storage systems is accessible after determining that the recall request could not be transmitted to the determined secondary storage system; and
transmitting changes to data at the primary storage system indicated in the change recording data structure to the determined secondary storage system in response to determining that the determined secondary storage system is accessible.

15. The system of claim 10, wherein the operations further comprise:
creating a consistency group for data on the primary storage system as of a point-in-time for each of the secondary storage systems to which data is mirrored, wherein data as of the point-in-time is copied to the secondary storage systems, wherein the recall request is received while copying the data as of the point-in-time to the secondary storage systems; and
cancelling each consistency group in response to receiving the recall request while copying the data as of the point-in-time to the secondary storage systems to end copying over data as of the point-in-time to the secondary storage systems.

16. The system of claim 15, wherein the point-in-time comprises a first point-in-time, wherein the operations further comprise for each cancelled consistency group:
recording updates to the data at the primary storage system in a change recording data structure before the recalling of the data object to the primary storage system has completed;
creating a new consistency group at a second point-in-time having the primary storage system and a secondary storage system in the cancelled consistency group after completing the recalling of the data object to the primary storage system and the secondary storage system; and
copying over data at the primary storage system as of the second point-in-time not yet mirrored to the secondary storage system for the new consistency group, including updates indicated in the change recording data structure, to the secondary storage system as part of the new consistency group.

17. A method for recalling data at a primary storage system coupled to a plurality of secondary storage systems, comprising:
mirroring data from the primary storage system to the secondary storage systems;
migrating, from the primary storage system, data objects to a remote storage location external to the primary storage system and the secondary storage systems, wherein the remote storage location stores migrated data objects from the primary storage system;
receiving, at the primary storage system, a recall request to recall a data object that was migrated from the primary storage system to the remote storage location;
causing transmission of the recall request to each of the secondary storage systems to cause each of the secondary storage systems receiving the recall request to directly retrieve the data object to recall from the remote storage location;
retrieving, by the primary storage system, the data object to recall from the remote storage location in response to the recall request; and
returning, by the primary storage system, complete to the recall request in response to the data object to recall being confirmed as restored to the primary storage system and to each of the secondary storage systems.

18. The method of claim 17, wherein the remote storage location is implemented in a cloud computing storage system accessible over an Internet, wherein the primary and the secondary storage systems communicate over a storage network separate from the Internet.

19. The method of claim 17, wherein the causing transmission of the recall request to at least one of the secondary storage systems comprises the primary storage system transmitting the recall request to each of the secondary storage systems to cause the secondary storage systems to directly recall the data object from the remote storage location.

20. The method of claim 17, further comprising:
in response to determining that the transmission of the recall request did not complete to at least one of the secondary storage systems, performing:
suspending mirroring of data to the secondary storage systems; and
indicating in a change recording data structure changes to data in the primary storage system resulting from host write operations and the recalling of the data object after suspending the mirroring of the data.

21. The method of claim 20, further comprising:
determining one of the secondary storage systems is accessible after determining that the recall request could not be transmitted to the determined secondary storage system; and
transmitting changes to data at the primary storage system indicated in the change recording data structure to the determined secondary storage system in response to determining that the determined secondary storage system is accessible.

22. The method of claim 17, further comprising:
creating a consistency group for data on the primary storage system as of a point-in-time for each of the secondary storage systems to which data is mirrored, wherein data as of the point-in-time is copied to the secondary storage systems, wherein the recall request is received while copying the data as of the point-in-time to the secondary storage systems; and
cancelling each consistency group in response to receiving the recall request while copying the data as of the point-in-time to the secondary storage systems to end copying over data as of the point-in-time to the secondary storage systems.

23. The method of claim 22, wherein the point-in-time comprises a first point-in-time, further comprising for each canceled consistency group:
recording updates to the data at the primary storage system in a change recording data structure before the recalling of the data object to the primary storage system has completed;
creating a new consistency group at a second point-in-time having the primary storage system and a secondary storage system in the cancelled consistency group after completing the recalling of the data object to the primary storage system and the secondary storage systems; and
copying over data at the primary storage system as of the second point-in-time not yet mirrored to the secondary storage system for the new consistency group, including updates indicated in the change recording data structure, to the secondary storage system as part of the new consistency group.

* * * * *